United States Patent
Khan et al.

(10) Patent No.: US 8,265,190 B2
(45) Date of Patent: *Sep. 11, 2012

(54) MULTIPLE ANTENNAS TRANSMIT DIVERSITY SCHEME

(75) Inventors: Farooq Khan, Allen, TX (US); Jianzhong Zhang, Irving, TX (US); Jiann-An Tsai, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/436,320

(22) Filed: Mar. 30, 2012

(65) Prior Publication Data

US 2012/0189076 A1    Jul. 26, 2012

Related U.S. Application Data

(63) Continuation of application No. 11/896,114, filed on Aug. 29, 2007, now Pat. No. 8,155,232.

(60) Provisional application No. 60/924,286, filed on May 8, 2007.

(51) Int. Cl.
*H04B 7/02* (2006.01)

(52) U.S. Cl. ........ 375/267; 375/260; 375/299; 375/308; 375/316; 370/208; 370/480; 370/335

(58) Field of Classification Search .................. 375/267, 375/260, 316, 308, 299; 370/208, 480, 335
See application file for complete search history.

(56) References Cited

U.S. PATENT DOCUMENTS

| | | | |
|---|---|---|---|
| 6,693,889 B1 | 2/2004 | Abe et al. | |
| 7,242,720 B2 * | 7/2007 | Sugiyama et al. | 375/260 |
| 7,539,259 B2 * | 5/2009 | Dias et al. | 375/267 |
| 7,606,320 B2 | 10/2009 | Chae et al. | |
| 7,782,573 B2 | 8/2010 | Zhou et al. | |
| 2002/0177441 A1 | 11/2002 | Ida et al. | |
| 2003/0081539 A1 | 5/2003 | Tong et al. | |
| 2005/0281322 A1 | 12/2005 | Lee et al. | |
| 2005/0281350 A1 | 12/2005 | Chae et al. | |
| 2006/0008021 A1 | 1/2006 | Bonnet | |

(Continued)

FOREIGN PATENT DOCUMENTS

EP    1 408 623 A2    4/2004

(Continued)

OTHER PUBLICATIONS

Wojciech Tadej, et al., "A Concise Guide to Complex Hadamard Matrices", Open Systems & Information Dynamics, vol. 13, No. 3, Jun. 2006, p. 133-177.

(Continued)

*Primary Examiner* — Eva Puente

(57) ABSTRACT

A method from transmitting data via multiple antennas. The method contemplates modulating data to be transmitted into a plurality of modulated symbols, encoding each pair of modulated symbols from among said plurality of symbols in accordance with a transmission diversity scheme to result in a plurality of 2 by 2 matrices, with each 2 by 2 matrix corresponding to each pair of modulated symbols, orthogonally spreading the plurality of 2 by 2 matrices to generate an output matrix, and transmitting the symbols in the output matrix via a plurality of antennas by using either a space time transmission diversity scheme, a space frequency transmission diversity scheme, or a combination of a space time transmission diversity scheme and a space frequency transmission diversity scheme.

8 Claims, 8 Drawing Sheets

U.S. PATENT DOCUMENTS

| | | | |
|---|---|---|---|
| 2006/0034383 A1 | 2/2006 | Su et al. | |
| 2006/0193245 A1 | 8/2006 | Aghvami et al. | |
| 2007/0140370 A1 | 6/2007 | Helard et al. | |
| 2007/0183527 A1 | 8/2007 | Jia et al. | |
| 2007/0195865 A1* | 8/2007 | Joetten et al. | 375/148 |
| 2008/0063115 A1 | 3/2008 | Varadarajan et al. | |
| 2008/0130769 A1* | 6/2008 | Papadopoulos et al. | 375/260 |
| 2008/0192846 A1 | 8/2008 | Bjerke et al. | |
| 2009/0122897 A1 | 5/2009 | Belogolovy et al. | |
| 2009/0323863 A1 | 12/2009 | Lee et al. | |

FOREIGN PATENT DOCUMENTS

| | | |
|---|---|---|
| JP | 2005-513953 | 5/2005 |
| KR | 10-2007-0038375 | 4/2007 |
| RU | 2288538 C2 | 11/2006 |
| WO | WO 02/080375 A2 | 10/2002 |
| WO | WO 03/056742 A1 | 7/2003 |
| WO | WO 2005/125140 | 12/2005 |
| WO | WO 2006/049443 A1 | 5/2006 |

OTHER PUBLICATIONS

"R1-072238, Transmit Diversity for 4-Tx Antenna", Samsung, 3GPP TSG RAN WG1 Archives, May 2, 2007, 11 pages.

Partial European Search Report dated May 25, 2010 in connection with European Patent Application No. 08 00 8691.

Decision on Grant dated Apr. 4, 2011 in connection with Russian Patent Application No. 2009141163/09.

European Search Report dated Aug. 26, 2010 in connection with European Patent Application No. 08 00 8691.

Chan-Byoung Chae, et al., "Antenna Grouping for STC", IEEE 802.16 Broadband Wireless Access Working Group <http://ieee802.org/16, Aug. 29, 2004, 7 pages.

Written Opinion of the International Searching Authority issued in Applicant's corresponding International Patent Application No. PCT/KR2008/002595 dated Oct. 6, 2008.

Canadian Office Action dated Mar. 13, 2012 in connection with Canadian Patent Application No. 2,686,315, 3 pages.

* cited by examiner

FIG. 2

|  | t1 | t2 |
|---|---|---|
| ANT 1 | $S_1$ | $-S_2^*$ |
| ANT 2 | $S_2$ | $S_1^*$ |

FIG. 3

|  | f1 | f2 |
|---|---|---|
| ANT 1 | $S_1$ | $-S_2^*$ |
| ANT 2 | $S_2$ | $S_1^*$ |

FIG. 4

|  | f1 | f2 |
|---|---|---|
| ANT 1 | $S_1$ | $S_2$ |
| ANT 2 | $-S_2^*$ | $S_1^*$ |

FIG. 6

| | t1 | t2 | t3 | t4 |
|---|---|---|---|---|
| ANT 1 | $S_1$ | $S_2$ | $S_1$ | $S_2$ |
| ANT 2 | $-S_2^*$ | $S_1^*$ | $-S_2^*$ | $S_1^*$ |
| ANT 3 | $S_3$ | $S_4$ | $S_3$ | $S_4$ |
| ANT 4 | $-S_4^*$ | $S_3^*$ | $-S_4^*$ | $S_3^*$ |

FIG. 7

| | t1 | t2 | t3 | t4 |
|---|---|---|---|---|
| ANT 1 | $S_1$ | $S_2$ | $S_1$ | $S_2$ |
| ANT 2 | $S_3$ | $S_4$ | $S_3$ | $S_4$ |
| ANT 3 | $-S_2^*$ | $S_1^*$ | $-S_2^*$ | $S_1^*$ |
| ANT 4 | $-S_4^*$ | $S_3^*$ | $-S_4^*$ | $S_3^*$ |

FIG. 8

| | t1 | t2 | t3 | t4 |
|---|---|---|---|---|
| ANT 1 | $S_1$ | $S_2$ | 0 | 0 |
| ANT 2 | 0 | 0 | $S_3$ | $S_4$ |
| ANT 3 | $-S_2^*$ | $S_1^*$ | 0 | 0 |
| ANT 4 | 0 | 0 | $-S_4^*$ | $S_3^*$ |

MULTIPLE ANTENNAS TRANSMIT DIVERSITY SCHEME

CLAIM OF PRIORITY

This application is a continuation of U.S. patent application Ser. No. 11/896,114 filed Aug. 29, 2007, entitled "MULTIPLE ANTENNAS TRANSMIT DIVERSITY SCHEME," now U.S. Pat. No. 8,155,232. This application also claims priority to U.S. Provisional Patent Application Ser. No. 60/924,286 filed on May 8, 2007. The content of the above-identified patent documents are hereby incorporated by reference in their entirety.

BACKGROUND OF THE INVENTION

1. Field of the Invention

The present invention relates to a method for transmitting data in a communication system, and more specifically, a process and circuits for transmitting information using multiple antennas transmission diversity scheme.

2. Description of the Related Art

A typical cellular radio system includes a number of fixed base stations and a number of mobile stations. Each base station covers a geographical area, which is defined as a cell.

Typically, a non-line-of-sight (NLOS) radio propagation path exists between a base station and a mobile station due to natural and man-made objects disposed between the base station and the mobile station. As a consequence, radio waves propagate while experiencing reflections, diffractions and scattering. The radio wave which arrives at the antenna of the mobile station in a downlink direction, or at the antenna of the base station in an uplink direction, experiences constructive and destructive additions because of different phases of individual waves generated due to the reflections, diffractions, scattering and out-of-phase reccombination. This is due to the fact that, at high carrier frequencies typically used in a contemporary cellular wireless communication, small changes in differential propagation delays introduces large changes in the phases of the individual waves. If the mobile station is moving or there are changes in the scattering environment, then the spatial variations in the amplitude and phase of the composite received signal will manifest themselves as the time variations known as Rayleigh fading or fast fading attributable to multipath reception. The time-varying nature of the wireless channel require very high signal-to-noise ratio (SNR) in order to provide desired bit error or packet error reliability.

The scheme of diversity is widely used to combat the effect of fast fading by providing a receiver with multiple faded replicas of the same information-bearing signal.

The schemes of diversity in general fall into the following categories: space, angle, polarization, field, frequency, time and multipath diversity. Space diversity can be achieved by using multiple transmit or receive antennas. The spatial separation between the multiple antennas is chosen so that the diversity branches, i.e., the signals transmitted from the multiple antennas, experience fading with little or no correlation. Transmit diversity, which is one type of space diversity, uses multiple transmission antennas to provide the receiver with multiple uncorrelated replicas of the same signal. Transmission diversity schemes can further be divided into open loop transmit diversity and closed-loop transmission diversity schemes. In the open loop transmit diversity approach no feedback is required from the receiver. In one type of closed loop transmit diversity, a receiver knows an arrangement of transmission antennas, computes a phase and amplitude adjustment that should be applied at the transmitter antennas in order to maximize a power of the signal received at the receiver. In another arrangement of closed loop transmit diversity referred to as selection transmit diversity (STD), the receiver provides feedback information to the transmitter regarding which antenna(s) to be used for transmission.

An example of open-loop transmission diversity scheme is the Alamouti 2×1 space-time diversity scheme. The Alamouti 2×1 space-time diversity scheme contemplates transmitting a Alamouti 2×2 block code using two transmission antennas using either two time slots (i.e., Space Time Block Code (STBC) transmit diversity) or two frequency subcarriers (i.e., Space Frequency Block Code (SFBC) transmit diversity).

One limitation of Alamouti 2×1 space-time diversity scheme is that this scheme can only be applied to two transmission antennas. In order to transmit data using four transmission antennas, a Frequency Switched Transmit Diversity (FSTD) or a Time Switched Transmit Diversity (TSTD) is combined with block codes. In case of combined SFBC+FSTD scheme or STBC+TSTD scheme, the matrix of the transmitted symbols from the four transmission antennas may be given as:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix} \quad (1)$$

where $T_{ij}$ represents symbol transmitted on the ith antenna and the jth subcarrier or jth time slot, and i=1,2,3,4, j=1,2,3,4 for the case of four transmission antennas, where $S_1$, $S_2$, $S_3$ and $S_4$ are symbols to be transmitted.

The problem with combined SFBC+FSTD scheme and STBC+TSTD schemes is that only a fraction of the total transmission antennas and hence power amplifier capability is used for transmission in a given frequency or time resource. This is indicated by '0' elements in the SFBC+FSTD and STBC+TSTD matrix given above. When the transmit power on the non-zero elements in the matrix is increased, bursty interference is generated to the neighboring cells degrading system performance. Generally, bursty interference manifests itself when certain phases of a frequency hopping pattern incur more interference than other phases.

SUMMARY OF THE INVENTION

It is therefore an object of the present invention to provide an improved method and transmitter circuit for transmitting data via multiple antennas.

It is another object to provide a method and transmitter circuit for transmitting data using multiple antennas transmission diversity scheme.

According to one aspect of the present invention, a method and transmitter circuit for data transmission is provided to modulate data to be transmitted into a plurality of modulated symbols, encode each pair of modulated symbols from among said plurality of symbols in accordance with a transmission diversity scheme to produce a plurality of 2 by 2 matrices, with each 2 by 2 matrix corresponding to each pair of modulated symbols, orthogonally spread the plurality of 2 by 2 matrices to generate an output matrix, and transmit the symbols in the output matrix via a plurality of antennas by using either a space time transmission diversity scheme, a space frequency transmission diversity scheme, or a combination of a space time transmission diversity scheme and a space frequency transmission diversity scheme.

The transmission diversity scheme may be an Alamouti diversity scheme, and each of the 2 by 2 matrices may be established by:

$$A = \frac{1}{\sqrt{2}} \begin{bmatrix} S_1 & S_2 \\ -S_2^* & S_1^* \end{bmatrix} \quad (2)$$

where $S_1$ and $S_2$ are one pair of the modulated symbols.

The orthogonal spreading of the plurality of 2 by 2 matrices may be performed according to an orthogonally spreading matrix selected from a group comprising a Fourier matrix, a Hadamard matrix and a Zadoff-Chu sequence.

The step of orthogonally spreading the plurality of the 2 by 2 matrices may includes generating an M by M code matrix C comprising the plurality of the 2 by 2 matrices $A_1$ through $A_n$ as the elements of the code matrix, with M corresponding to the number of the antennas, and the code matrix C being established by:

$$C = \begin{bmatrix} A_1 & A_1 & \cdots & A_1 \\ A_2 & A_2 & \cdots & A_2 \\ \vdots & \vdots & \ddots & \vdots \\ A_n & A_n & \cdots & A_n \end{bmatrix} \quad (3)$$

where n is an integer between 0 and N−1, and N=M/2, generating an M by M spreading matrix which is a Kronecker product of an N by N orthogonally spreading matrix and an 2 by 2 matrix with all elements being 1, and orthogonally spreading the M by M code matrix C by an element-wise multiplication of the N by N code matrix C and the M by M spreading matrix to generating the N by N output matrix.

A selected pair of rows in the output matrix may be exchanged.

A selected pair of columns in the output matrix may be exchanged.

The exchanging of either the selected pair of rows or the selected pair of columns may be known by a receiver before receiving data from a transmitter.

According to another aspect of the present invention, a method for data transmission is provided to modulate data to be transmitted into a plurality of modulated symbols, encode each pair of modulated symbols from among said plurality of symbols in accordance with a transmission diversity scheme to result in a plurality of 2 by 2 matrices, with each 2 by 2 matrix corresponding to each pair of modulated symbols, generate an output matrix with the plurality of the 2 by 2 matrices as the elements of the output matrix, exchange either a selected pair of rows of the output matrix, or a selected pair of columns of the output matrix, and transmit the symbols in the output matrix via a plurality of antennas by using either a space time transmission diversity scheme, a space frequency transmission diversity scheme, or a combination of a space time transmission diversity scheme and a space frequency transmission diversity scheme.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 is an illustration of a Space Time Block Code transmission diversity scheme for two transmission antennas;

FIG. 3 is an illustration of a Space Frequency Block Code transmission diversity scheme for two transmission antennas;

FIG. 4 is an illustration of an alternative Space Frequency Block Code transmission diversity scheme for two transmission antennas;

FIG. 6 is an illustration of a transmission diversity scheme for four transmission antennas according to a first embodiment of the principles of the present invention;

FIG. 7 is an illustration of a transmission diversity scheme for four transmission antennas according to a second embodiment of the principles of the present invention;

FIG. 8 is an illustration of a transmission diversity scheme for four transmission antennas according to a third embodiment of the principles of the present invention;

DETAILED DESCRIPTION OF THE INVENTION

The present invention will be described more fully hereinafter with reference to the accompanying drawings, in which preferred embodiments of the invention are shown. As those skilled in the art would realize, the described embodiments may be modified in various different ways, all without departing from the spirit or scope of the present invention.

Figure 1:
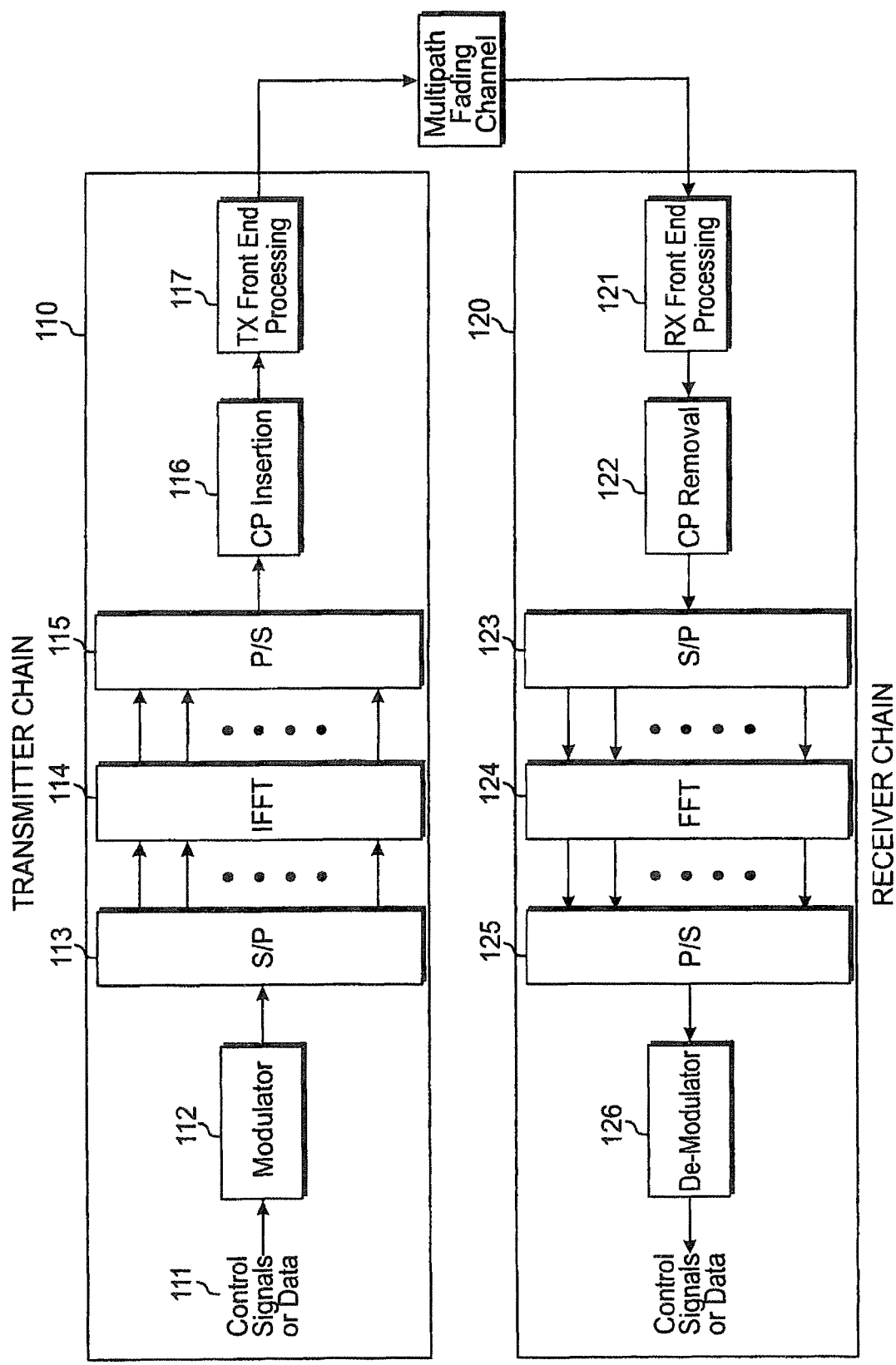
FIG. 1 is an illustration of an Orthogonal Frequency Division Multiplexing (OFDM) transceiver chain suitable for the practice of the principles of the present inventions.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The scheme of diversity is widely used to combat the effect of fast fading by providing a receiver with multiple faded replicas of the same information-bearing signal. An example of open-loop transmission diversity scheme is the Alamouti 2×1 space-time block code (STBC) transmission diversity scheme as illustrated in FIG. 2. In this approach, during any symbol period, i.e., time period, a transmitter transmits two data symbols via two transmission antennas to a receiver. As shown in FIG. 2, during the first symbol interval t1, symbols $S_1$ and $S_2$ are respectively transmitted via antennas ANT 1 and ANT 2. During the next symbol period t2, symbols −S*2 and S*$_1$ are respectively transmitted via antennas ANT 1 and ANT 2, where x* represents complex conjugate of x. After receiving the signals, the receiver performs a plurality of processes to recover original symbols $S_1$ and $S_2$. Note that the instantaneous channel gains g1 and g2 for ANT 1 and ANT 2, respectively, are required for processing at the receiver. Therefore, the transmitter needs to transmit separate pilot symbols via both the antennas ANT 1 and ANT 2 for channel gain estimation at the receiver. The diversity gain achieved by Alamouti coding is the same as that achieved in Maximum Ratio Combining (MRC).

The 2×1 Alamouti scheme can also be implemented in a space-frequency block code (SFBC) transmission diversity scheme as illustrated in FIG. 3. As shown in FIG. 3, symbols $S_1$ and $S_2$ are respectively transmitted to a receiver via antennas ANT 1 and ANT 2 on a first subcarrier having frequency f1 in an Orthogonal Frequency Division Multiplexing (OFDM) system, symbols $-S^*_2$ and $S^*_1$ are respectively transmitted via antennas ANT 1 and ANT 2 on a second subcarrier having frequency 12. Therefore a matrix of transmitted symbols from antennas ANT 1 and ANT 2 can be written as:

$$\begin{bmatrix} T_{11} & T_{12} \\ T_{21} & T_{22} \end{bmatrix} = \begin{bmatrix} S_1 & -S^*_2 \\ S_2 & S^*_1 \end{bmatrix}, \quad (4)$$

The received signal at the receiver on subcarrier having frequency f1 is $r_1$, and the received signal at the receiver on subcarrier having frequency 12 is $r_2$. $r_1$ and $r_2$ can be written as:

$$r_1 = h_1 s_1 + h_2 s_2 + n_1$$

$$r_2 = h_1 s_2^* + h_2 s_1^* + n_2' \quad (5)$$

where $h_1$ and $h_2$ are channel gains from ANT 1 and ANT 2 respectively. We also assume that the channel from a given antennas does not change between subcarrier having frequency $f_1$ and subcarrier having frequency $f_2$. The receiver performs equalization on the received signals and combines the two received signals ($r_1$ and $r_2$) to recover the symbols $S_1$ and $S_2$. The recovered symbols $\hat{S}_1$ and $\hat{S}_2$ can be written as:

$$\begin{aligned}
\hat{s}_1 &= h_1^* r_1 + h_2 r_2^* \\
&= h_1^*(h_1 s_1 + h_2 s_2 + n_1) + h_2(-h_1 s_2^* + h_2 s_1^* + n_2)^* \\
&= (|h_1|^2 + |h_2|^2) s_1 + h_1^* n_1 + h_2 n_2^* \\
\hat{s}_2 &= h_2^* r_1 + h_1 r_2^* \\
&= h_2^*(h_1 s_1 + h_2 s_2 + n_1) + h_1(-h_1 s_2^* + h_2 s_1^* + n_2)^* \\
&= (|h_1|^2 + |h_2|^2) s_2 + h_2^* n_1 + h_1 n_2^*
\end{aligned} \quad (6)$$

It can be seen that both of the transmitted symbols $\hat{S}_1$ and $\hat{S}_2$ achieve full spatial diversity, that is, the each of the transmitted symbols $\hat{S}_1$ and $\hat{S}_2$ completely removes an interference from the other one.

An alternative mapping for two transmission antennas SFBC scheme is shown in FIG. 4. A matrix of transmitted symbols from antennas ANT 1 and ANT 2 can be written as:

$$\begin{bmatrix} T_{11} & T_{12} \\ T_{21} & T_{22} \end{bmatrix} = \begin{bmatrix} S_1 & S_2 \\ -S^*_2 & S^*_1 \end{bmatrix}, \quad (7)$$

The transmit matrix in Equation (7) for the scheme in FIG. 4 is a transpose of the transmit matrix in Equation (4) for the scheme shown in FIG. 3.

Other proposals found in the art for four transmission antennas transmit diversity combines Frequency Switched Transmit Diversity (FSTD) or Time Switched Transmit Diversity (TSTD) with block codes. In case of combined SFBC+FSTD scheme or STBC+TSTD scheme, the matrix of the transmitted symbols from the four transmission antennas are given as:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S^*_2 & S^*_1 & 0 & 0 \\ 0 & 0 & S_3 & S_4 \\ 0 & 0 & -S^*_4 & S^*_3 \end{bmatrix} \quad (8)$$

where $T_{ij}$ represents symbol transmitted on the ith antenna and the jth subcarrier or jth time slot, and i=1,2,3,4, j=1,2,3,4 for the case of four transmission antennas. A and B are block codes given as below.

$$A = \frac{1}{\sqrt{2}} \begin{bmatrix} S_1 & S_2 \\ -S^*_2 & S^*_1 \end{bmatrix} \quad (9)$$

$$B = \frac{1}{\sqrt{2}} \begin{bmatrix} S_3 & S_4 \\ -S^*_4 & S^*_3 \end{bmatrix}$$

An equivalent representation of the above SFBC+FSTD transmit signal given in equation (1) exists in the following form. Let the transmit signal vector $y(i)=[y^{(0)}(i)\ y^{(1)}(i)\ y^{(2)}(i)\ y^{(3)}(i)]^T$ denote the transmit signal vector on four transmit antennas for the ith subcarrier. The transmit signal generated from the SFBC+FSTD scheme in (1) can be equivalently written as follows, assuming the transmit signal is mapped to the four consecutive subcarriers 4i, 4i+1, 4i+1, 4i+3:

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 1 & 0 & 0 & 0 & j & 0 & 0 & 0 \\ 0 & -1 & 0 & 0 & 0 & j & 0 & 0 \\ 0 & 0 & 0 & 0 & 0 & 0 & 0 & 0 \\ 0 & 0 & 0 & 0 & 0 & 0 & 0 & 0 \\ 0 & 1 & 0 & 0 & 0 & j & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & -1 & 0 & 0 & 0 & j \\ 0 & 0 & 0 & 0 & 0 & 0 & 0 & 0 \\ 0 & 0 & 0 & 0 & 0 & 0 & 0 & j \\ 0 & 0 & 1 & 0 & 0 & 0 & -j & 0 \end{bmatrix} \times \begin{bmatrix} \operatorname{Re}(S_1(i)) \\ \operatorname{Re}(S_2(i)) \\ \operatorname{Re}(S_3(i)) \\ \operatorname{Re}(S_4(i)) \\ \operatorname{Im}(S_i(i)) \\ \operatorname{Im}(S_2(i)) \\ \operatorname{Im}(S_3(i)) \\ \operatorname{Im}(S_4(i)) \end{bmatrix} \quad (10)$$

where each of $S_1(i)$, $S_2(i)$, $S_3(i)$, $S_4(i)$ is a functions of index i.

The problem with combined SFBC+FSTD scheme and STBC+TSTD schemes is that only a fraction of the total transmission antennas and hence power amplifier (PA) capability is used for transmission in a given frequency or time resource. This is indicated by '0' elements in the SFBC+FSTD and STBC+TSTD matrix given above. When the transmit power on the non-zero elements in the matrix is increased, bursty interference is generated to the neighboring cells degrading system performance.

Figure 5:
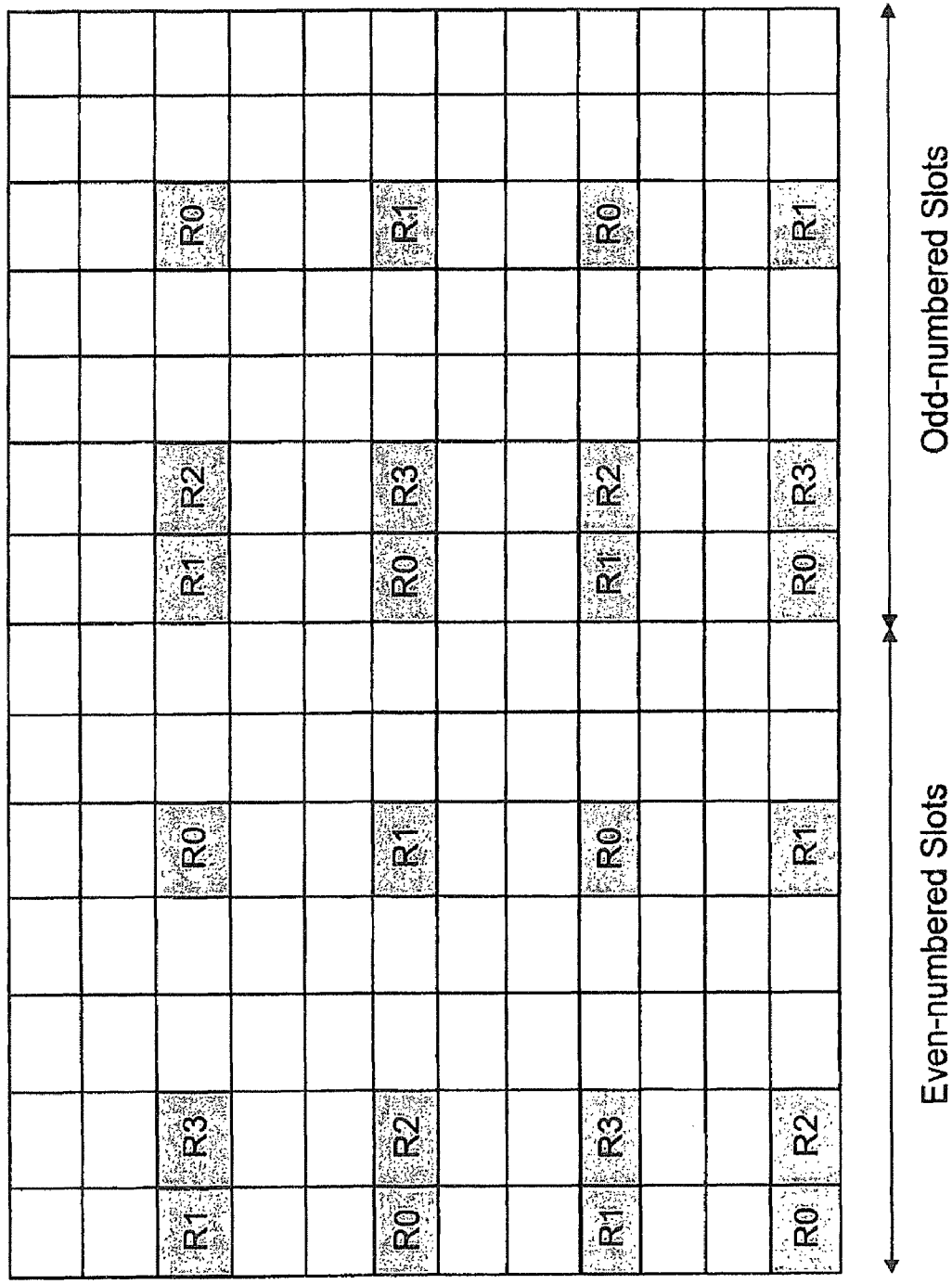
FIG. 5 is an illustration of mapping of downlink reference signals in a contemporary $3^{rd}$ Generation Partnership Project Long Term Evolution system.

The downlink reference signals mapping for four transmission antennas in the 3GPP LTE (3$^{rd}$ Generation Partnership Project Long Term Evolution) system is shown in FIG. 5. The notation $R_p$ is used to denote a resource element used for reference signal transmission on antenna port p. It can be noted that density on antenna ports 2 and 3 is half the density on antenna ports 0 and 1. This leads to weaker channel estimates on antenna ports 2 and 3 relative to channel estimates on antenna ports 0 and 1.

In the current invention we describe an open-loop transmission diversity scheme where Alamouti block code is spread with an orthogonal function to provide diversity for transmissions via more than two transmission antennas. We will describe the invention assuming a Fourier matrix. It should be noted that the principles of the current invention can be easily extended and applied to the cases of other orthogonal functions such as Hadamard function or Zadoff-Chu (ZC) sequences.

A Fourier matrix is a N×N square matrix with entries given by:

$$P_N = e^{j2\pi mn/N} \quad m,n=0,1,\ldots(N-1) \quad (11)$$

For example, a 2×2 Fourier matrix can be expressed as:

$$P_2 = \begin{bmatrix} 1 & 1 \\ 1 & e^{j\pi} \end{bmatrix} = \begin{bmatrix} 1 & 1 \\ 1 & -1 \end{bmatrix} \quad (12)$$

Similarly, a 4×4 Fourier matrix can be expressed as:

$$P_4 = \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} = \begin{bmatrix} 1 & 1 & 1 & 1 \\ 1 & j & -1 & -j \\ 1 & -1 & 1 & -1 \\ 1 & -j & -1 & j \end{bmatrix} \quad (13)$$

Multiple Fourier matrices can be defined by introducing a shift parameter (g/G) in the Fourier matrix. The entry of the multiple Fourier matrices is given by:

$$P_{mn} = e^{j2\pi \frac{m}{N}\left(n+\frac{g}{G}\right)} \quad m,n=0,1,\ldots(N-1) \quad (14)$$

A set of four 2×2 Fourier matrices can be defined by taking G=4, and g=0, 1, 2 and 3 are written as:

$$P_2^0 = \begin{bmatrix} 1 & 1 \\ 1 & -1 \end{bmatrix} \quad (15)$$

$$P_2^1 = \begin{bmatrix} 1 & 1 \\ e^{j\pi/4} & -e^{j\pi/4} \end{bmatrix} \quad (16)$$

$$P_2^2 = \begin{bmatrix} 1 & 1 \\ e^{j\pi/2} & -e^{j\pi/2} \end{bmatrix} \quad (17)$$

$$P_2^3 = \begin{bmatrix} 1 & 1 \\ e^{j3\pi/4} & -e^{j3\pi/4} \end{bmatrix} \quad (18)$$

Note that in addition to the set of four Fourier matrices listed above, we can also apply row or column permuted versions of these set of Fourier matrices. For example, the row and column permutations of the matrix $P_2^0$ is given by:

$$P_2^5 = \frac{1}{\sqrt{2}}\begin{bmatrix} 1 & 1 \\ -1 & 1 \end{bmatrix} \quad P_2^6 = \frac{1}{\sqrt{2}}\begin{bmatrix} 1 & -1 \\ 1 & 1 \end{bmatrix} \quad (19)$$

For each Fourier matrix, there are two permuted versions. So the total number of the spread matrix P is 12.

In a k-th Zadoff-Chu sequence, an n-th entry $c_k(n)$ of the k-th Zadoff-Chu sequence can be expressed as:

$$c_k(n) = e^{j2\pi k \frac{n(n+1)/2+qn}{L}}$$

where L is a positive odd integer $$c_k(n) = e^{j2\pi k \frac{n^2/2+qn}{L}}$$

where L is a positive even integer where k is an integer which is relatively prime with L, and q is an integer.

A Hadamard matrix of order n is a solution to Hadamard's matrimum determinant problem. An equivalent definition of the Hadamard matrices is given by:

$$H_n H_n^T = nI_n \quad (21)$$

where In is an n×n identity matrix.

For example, a Hadamard matrix of order 4 can be expresses as:

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (22)$$

In a first embodiment according to the principles of the present invention, we assume that four symbols $S_1, S_2, S_3$ and $S_4$ are transmitted on four subcarriers using four transmission antennas. Let us define matrix A and B as below.

$$A = \frac{1}{\sqrt{2}}\begin{bmatrix} S_1 & S_2 \\ -S_2^* & S_1^* \end{bmatrix} \quad (23)$$

-continued $$B = \frac{1}{\sqrt{2}} \begin{bmatrix} S_3 & S_4 \\ -S_4^* & S_3^* \end{bmatrix}$$

It can be seen that each matrix A and B is an Alamouti code for the pair of symbols $S_1$ and $S_2$, and the pair of symbols $S_3$ and $S_4$, respectively. We construct a 2×2 matrix with A and B as its elements and perform an element-by-element multiplication with an expanded 2×2 Fourier matrix as below. Note that the operator. * denotes element-wise multiplication and ⊗ denotes kronecker product.

$$T_i = \frac{1}{\sqrt{2}} \begin{bmatrix} A & A \\ B & B \end{bmatrix} \cdot * \left( P_2^i \otimes \begin{bmatrix} 1 & 1 \\ 1 & 1 \end{bmatrix} \right), \text{ for } i = 1, \ldots, 12. \quad (24)$$

For i=0 case, the resulting 4×4 matrix denoting discrete Fourier transform DFT-spread SFBC or DFT-spread STBC is given as below.

$$T_0 = \frac{1}{\sqrt{2}} \begin{bmatrix} A & A \\ B & B \end{bmatrix} \cdot * \left( P_2^0 \otimes \begin{bmatrix} 1 & 1 \\ 1 & 1 \end{bmatrix} \right) \quad (25)$$

$$= \frac{1}{\sqrt{2}} \begin{bmatrix} A & A \\ B & B \end{bmatrix} \cdot * \left( \frac{1}{\sqrt{2}} \begin{bmatrix} 1 & 1 \\ 1 & -1 \end{bmatrix} \otimes \begin{bmatrix} 1 & 1 \\ 1 & 1 \end{bmatrix} \right)$$

$$= \frac{1}{\sqrt{4}} \begin{bmatrix} S_1 & S_2 & S_1 & S_2 \\ -S_2^* & S_1^* & -S_2^* & S_1^* \\ S_3 & S_4 & -S_3 & -S_4 \\ -S_4^* & S_3^* & S_4^* & -S_3^* \end{bmatrix}$$

For the case where the spreading matrix is a permuted version of the Fourier matrix, for example, for i=5, we have $$T_5 = \frac{1}{\sqrt{2}} \begin{bmatrix} A & A \\ B & B \end{bmatrix} \cdot * \left( P_2^5 \otimes \begin{bmatrix} 1 & 1 \\ 1 & 1 \end{bmatrix} \right) \quad (26)$$

$$= \frac{1}{\sqrt{2}} \begin{bmatrix} A & A \\ B & B \end{bmatrix} \cdot * \left( \frac{1}{\sqrt{2}} \begin{bmatrix} 1 & 1 \\ -1 & 1 \end{bmatrix} \otimes \begin{bmatrix} 1 & 1 \\ 1 & 1 \end{bmatrix} \right)$$

$$T_5 = \frac{1}{\sqrt{4}} \begin{bmatrix} S_1 & S_2 & S_1 & S_2 \\ -S_2^* & S_1^* & -S_2^* & S_1^* \\ -S_3 & -S_4 & S_3 & S_4 \\ S_4^* & -S_3^* & -S_4^* & S_3^* \end{bmatrix}$$

For a given matrix (for example matrix $T_o$), the element on row m, column n is denoted by $[T_0]_{m,n}$ and $[T_0]_{m,n}$ represents the symbol transmitted on the mth antenna and the nth subcarrier or nth time slot, m=1,2,3,4 and n=1,2,3,4 for the case of four transmission antennas. FIG. 6 is an illustration of the transmission diversity scheme for four transmission antennas and four time slots according to the first embodiment of the principles of the present invention.

It can be noted that the same principle can be applied to the case where the 4×4 matrix transmission is over a mix of subcarriers and time slots. For example, the four elements (index n) can be constructed with 2 subcarriers and 2 time slots.

In a second embodiment according to the principles of the present invention, we exchange the second row and the third row of $T_i$, thus resulting in a new SFBC matrix called $T_{i,r}$. $T_{i,r}$ is useful for evening out pilot-density disparity inherent in the reference signal structure of the LTE system. For example, $T_{0,r}$ is given by the following.

$$T_{0,r} = \frac{1}{\sqrt{4}} \begin{bmatrix} S_1 & S_2 & S_1 & S_2 \\ S_3 & S_4 & -S_3 & -S_4 \\ -S_2^* & S_1^* & -S_2^* & S_1^* \\ -S_4^* & S_3^* & S_4^* & -S_3^* \end{bmatrix} \quad (27)$$

FIG. 7 is an illustration of the transmission diversity scheme for four transmission antennas and four time slots according to the second embodiment of the principles of the present invention.

In a third embodiment according to the principles of the present invention, we propose to exchange the second and the third row of the SFBC-FSTD matrix as expressed in Equation (8), thus resulting in new SFBC matrix as expressed in the following Equation (28). By this operation, symbols $S_1$ and $S_2$ are transmitted over antennas ports 0 and 2 while symbols $S_3$ and $S_4$ are transmitted over antenna ports 1 and 3 as given by the transmit matrix below. Again, this is useful for evening out pilot-density disparity inherent in the reference signal structure of the LTE system.

$$\begin{bmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix} \quad (28)$$

FIG. 8 is an illustration of the transmission diversity scheme for four transmission antennas and four time slots according to the third embodiment of the principles of the present invention.

In a fourth embodiment according to the principles of the present invention, we switch the second and third columns of matrix $T_5$, thus resulting in a new matrix expressed in the following Equation (29):

$$T_P = \frac{1}{\sqrt{4}} \begin{bmatrix} S_1 & S_1 & S_2 & S_2 \\ -S_2^* & -S_2^* & S_1^* & S_1^* \\ -S_3 & S_3 & -S_4 & S_4 \\ S_4^* & -S_4^* & -S_3^* & S_3^* \end{bmatrix} \quad (29)$$

Figure 9:
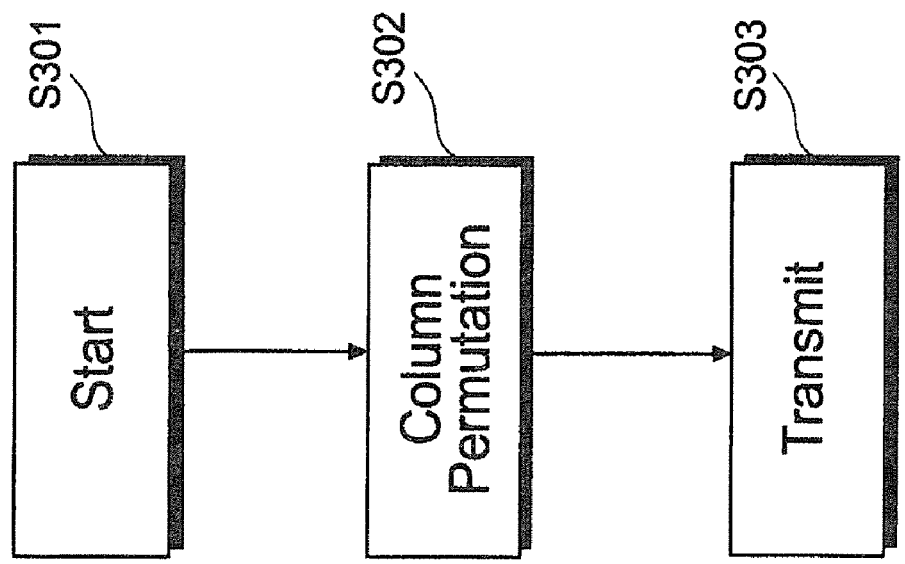
FIG. 9 is an illustration of a column permutation embodiment practical according to the principles of the present invention.

An example of column permutation according to the principles of the current invention is given in FIG. 9. In step S301, output matrix $T_5$ is generated according the method described in the first embodiment of the present invention. In step S302, the second column and the third column of output matrix $T_5$ is exchanged (i.e., permutated) to generate a new output matrix T. In step S303, the symbols in output matrix $T_p$ is transmitted via multiple antennas.

It should be noted that the principles of the current invention also apply to the cases where columns other than the second and the third column are switched. Also, the base station can perform column switching in a predetermined fashion which is known to the user equipment. It is also possible to always use the fixed permuted matrix $T_P$ as shown in Equation (29).

Figure 10:
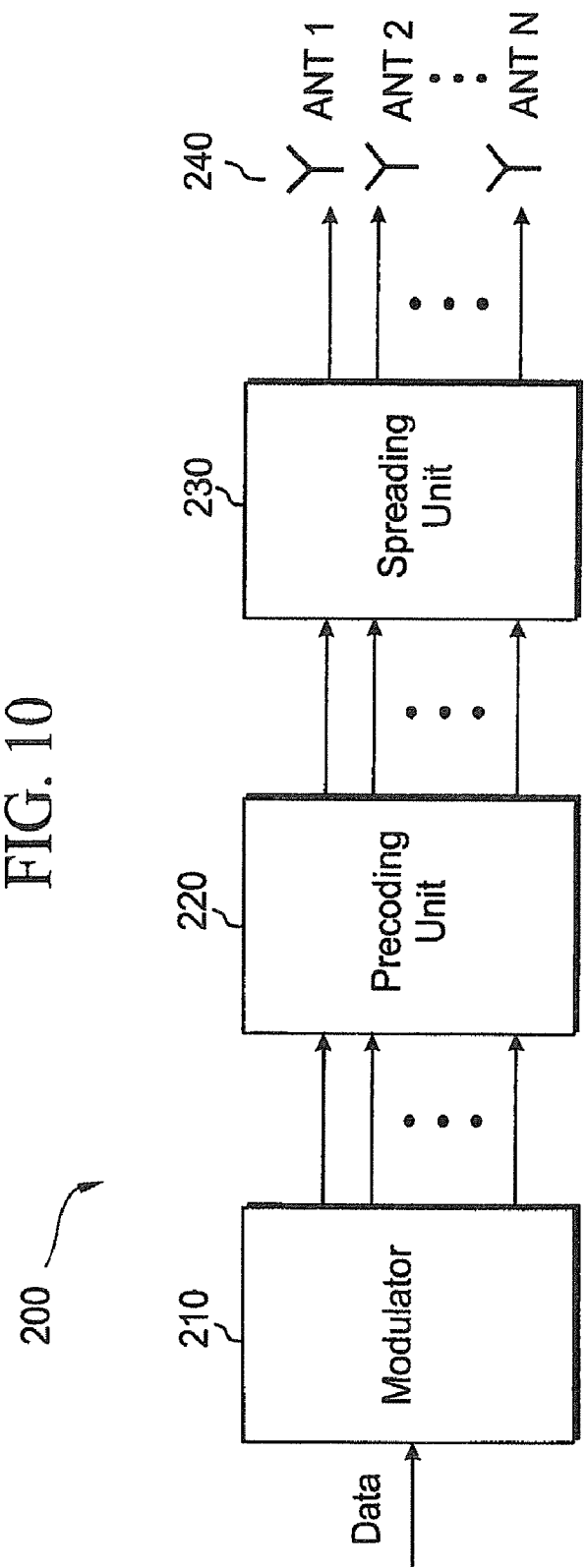
FIG. 10 is an illustration of a transmitter constructed as an exemplary embodiment according to the principles of the present invention.

FIG. 10 is an illustration of a transmitter constructed as an exemplary embodiment according to the principles of the present invention. Transmitter 200 is constructed with a modulator 210, a precoding unit 220, a spreading unit 230 and a plurality of antennas 240. Modulator 210 modulates data to be transmitted into a plurality of modulated symbols. Precoding unit 220 encodes each pair of modulated symbols from among said plurality of symbols in accordance with a transmission diversity scheme to result in a plurality of 2 by 2 matrices. Here, each 2 by 2 matrix corresponds to each pair of modulated symbols. Spreading unit 230 orthogonally spreads the plurality of 2 by 2 matrices to generate an output matrix. The symbols in the output matrix is transmitted through the plurality of antennas 240 by using either a space time transmission diversity scheme, a space frequency transmission diversity scheme, or a combination of a space time transmission diversity scheme and a space frequency transmission diversity scheme.

What is claimed is:

1. An apparatus configured to transmit data, the apparatus comprising:
    a modulator configured to modulate data to be transmitted into a plurality of modulated symbols; and
    a transmitter configured to transmit the plurality of modulated symbols according to an output matrix by using a space frequency transmission diversity scheme via a plurality of antennas through a plurality of frequency subcarriers,
    wherein a first symbol and a second symbol are transmitted via a first antenna through a first frequency subcarrier and a second frequency subcarrier respectively, a third symbol and a fourth symbol are transmitted via a second antenna through a third frequency subcarrier and a fourth frequency subcarrier respectively, an inverse complex conjugate of the second symbol and a complex conjugate of the first symbol are transmitted via a third antenna through the first frequency subcarrier and the second frequency subcarrier respectively, and an inverse complex conjugate of the fourth symbol and a complex conjugate of the third symbol are transmitted via a fourth antenna through the third frequency subcarrier and the fourth frequency subcarrier respectively, and
    wherein a density of resource elements used for a reference signal transmission on the third antenna and the fourth antenna is lower than a density of resource elements used for the reference signal transmission on the first antenna and the second antenna.

2. The apparatus as claimed in claim 1, wherein the output matrix is based on:

$$\begin{bmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix}$$

where $S_1$, $S_2$, $S_3$ and $S_4$ are the plurality of modulated symbols to be transmitted via the plurality of antennas.

3. The apparatus as claimed in claim 1, wherein, when the plurality of modulated symbols transmitted through the plurality of frequency subcarriers are $4i$, $4i+1$, $4i+2$ and $4i+3$, the output matrix is basd on:

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \mathrm{Re}(S_1(i)) \\ \mathrm{Re}(S_2(i)) \\ \mathrm{Re}(S_3(i)) \\ \mathrm{Re}(S_4(i)) \\ \mathrm{Im}(S_1(i)) \\ \mathrm{Im}(S_2(i)) \\ \mathrm{Im}(S_3(i)) \\ \mathrm{Im}(S_4(i)) \end{bmatrix}$$

where $S_1(i)$, $S_2(i)$, $S_3(i)$ and $S_4(i)$ are the plurality of modulated symbols.

4. The apparatus as claimed in claim 1, wherein the density of resource elements used for the reference signal transmission on the third antenna and the fourth antenna is half of the density of resource elements used for the reference signal transmission on the first antenna and the second antenna.

5. An apparatus configured to receive data, the apparatus comprising:
    a receiver configured to receive a plurality of symbols transmitted according to an output matrix by using a space frequency transmission diversity scheme via a plurality of antennas through a plurality of frequency subcarriers; and
    a demodulator configured to demodulate the plurality of symbols,
    wherein a first symbol and a second symbol are transmitted via a first antenna through a first frequency subcarrier and a second frequency subcarrier respectively, a third symbol and a fourth symbol are transmitted via a second antenna through a third frequency subcarrier and a fourth frequency subcarrier respectively, an inverse complex conjugate of the second symbol and a complex conjugate of the first symbol are transmitted via a third antenna through the first frequency subcarrier and the second frequency subcarrier respectively, and an inverse complex conjugate of the fourth symbol and a complex conjugate of the third symbol are transmitted via a fourth antenna through the third frequency subcarrier and the fourth frequency subcarrier respectively, and wherein a density of resource elements used for a reference signal transmission on the third antenna and the fourth antenna is lower than a density of resource elements used for the reference signal transmission on the first antenna and the second antenna.

6. The apparatus as claimed in claim 5, wherein the output matrix is based on:

$$\begin{bmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix}$$

where $S_1$, $S_2$, $S_3$ and $S_4$ are the plurality of symbols to be transmitted via the plurality of antennas.

7. The apparatus as claimed in claim 5, wherein, when the plurality of symbols transmitted through the plurality of frequency subcarriers are 4i, 4i+1, 4i+2 and 4i+3, the output matrix is based on:

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \mathrm{Re}(S_1(i)) \\ \mathrm{Re}(S_2(i)) \\ \mathrm{Re}(S_3(i)) \\ \mathrm{Re}(S_4(i)) \\ \mathrm{Im}(S_1(i)) \\ \mathrm{Im}(S_2(i)) \\ \mathrm{Im}(S_3(i)) \\ \mathrm{Im}(S_4(i)) \end{bmatrix}$$

where $S_1(i)$, $S_2(i)$, $S_3(i)$ and $S_4(i)$ are the plurality of symbols.

8. The apparatus as claimed in claim 5, wherein the density of resource elements used for reference signal transmission on the third antenna and the fourth antenna is half of density of resource elements used for reference signal transmission on the first antenna and the second antenna.

* * * * *